(No Model.)
J. W. MESSENGER.
FENCE.
No. 293,342.  Patented Feb. 12, 1884.
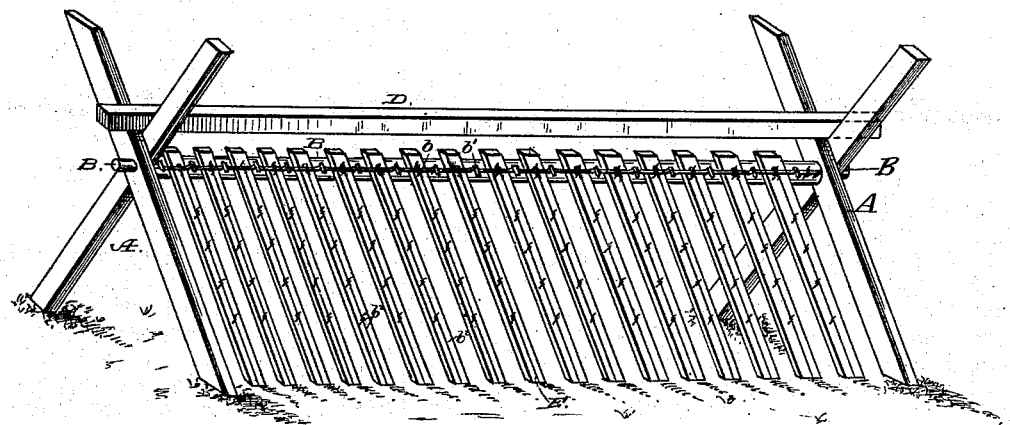
Witnesses:
J. E. Clark.
H. J. Osgood.
Inventor,
John W. Messenger
per Howard A. Snow
his
Attorney.

UNITED STATES PATENT OFFICE.

JOHN WM. MESSENGER, OF SENTERFITT, TEXAS.

FENCE.

SPECIFICATION forming part of Letters Patent No. 293,342, dated February 12, 1884.

Application filed August 30, 1882. (No model.)

*To all whom it may concern:*

Be it known that I, JOHN W. MESSENGER, a citizen of the United States, residing at Senterfitt, in the county of Lampasas and State of Texas, have invented certain new and useful Improvements in Fences, of which the following is a specification, reference being had therein to the accompanying drawing.

My invention relates to wood and wire fences; and it consists in the construction and arrangement of its several parts, as will be hereinafter fully set forth, and pointed out in the claim.

The drawing represents a perspective view of a section of my fence.

A are the cross fence-posts, secured together by the stringer B, as shown, and laid in the forks of said posts is the top rail, D, as shown. E are the slats extending slantingly from the stringer B to the ground, as shown. They are secured to the stringer by the barbed wire $b$, over which, in the spaces between the slats, are driven staples $b'$. Along the outer side of each slat is secured a strand of barbed wire, $b^2$, which prevents cattle from pressing against the fence.

The advantages of this fence are that it can be readily taken apart and removed from place to place, and that the barbed wire upon the stringer and slats prevents animals from breaking through it.

I am aware of the patent to Beamon, No. 156,052, but do not claim such construction as my invention.

What I claim is—

The fence consisting of the cross-posts A, pivoted to the stringer B, provided with a top rail, D, and having slats E, extending from the stringer to the ground, and secured to said stringer by the barbed wire $b$ and staples $b'$; said slats being further provided with barbed wire $b^2$, substantially as shown and described.

In testimony whereof I hereby affix my signature in presence of two witnesses.

JOHN WM. MESSENGER.

Witnesses:
P. C. JACKSON,
J. A. POSEY.